United States Patent

[11] 3,586,390

| [72] | Inventors | Wilbur M. Page;<br>Ralph Coupland, both of Lincoln, England |
|---|---|---|
| [21] | Appl. No. | 824,587 |
| [22] | Filed | May 14, 1969 |
| [45] | Patented | June 22, 1971 |
| [73] | Assignee | Clayton Dewandre Company Limited<br>Lincoln, England |
| [32] | Priority | May 16, 1968 |
| [33] | | Great Britain |
| [31] | | 23,375/68 |

[54] AIR PRESSURE BRAKING SYSTEMS
7 Claims, 1 Drawing Fig.

| [52] | U.S. Cl. | 303/22, 303/40 |
|---|---|---|
| [51] | Int. Cl. | B60t 8/18, B60t 13/26 |
| [50] | Field of Search | 303/22, 22 A, 6, 6 C, 7, 40 |

[56] References Cited
UNITED STATES PATENTS

| 2,940,796 | 6/1960 | Ortmann et al. | 303/22 |
| 3,178,238 | 4/1965 | Dean | 303/22 |
| 3,304,129 | 2/1967 | Wilson | 303/22 X |
| 3,404,922 | 10/1968 | Valentine | 303/22 X |
| 3,484,138 | 12/1969 | Cumming | 303/22 |

*Primary Examiner*—Milton Buchler
*Assistant Examiner*—John J. McLaughlin
*Attorney*—Norris & Bateman

ABSTRACT: In an air pressure braking system comprising a combined apportioning valve and relay emergency valve in which an input piston structure is responsive at one side to a signal pressure and at the other side to a force exerted by a reaction piston and action through means variable in accordance with vehicle load, a cutout valve is provided operable at will to interrupt the application of braking pressure to the reaction piston and to direct it to said other side of the input piston.

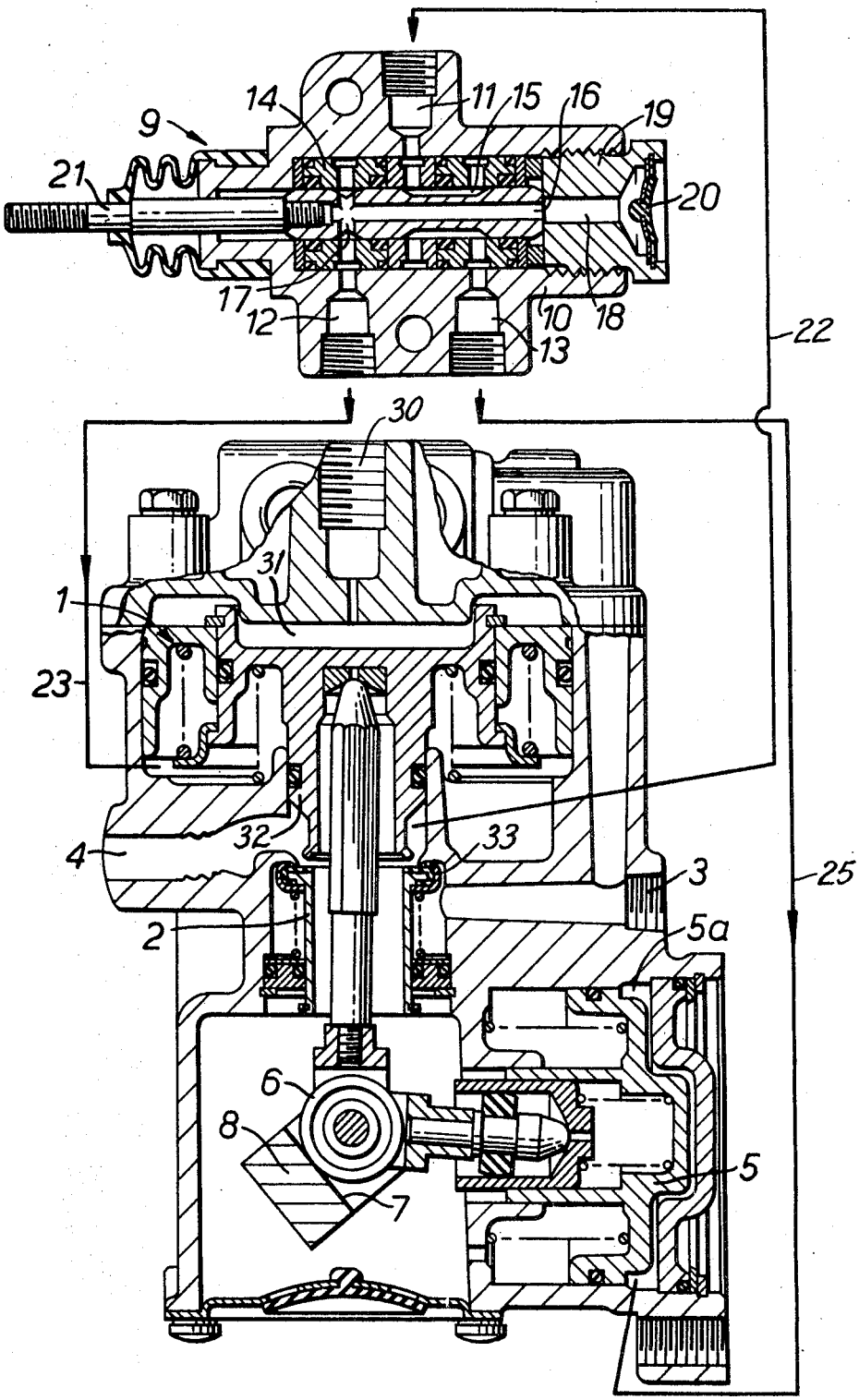

AIR PRESSURE BRAKING SYSTEMS

This invention relates to air pressure braking systems for tractor-trailer combinations and particularly to systems in which the trailer incorporates an apportioning valve comprising an input piston structure responsive to a signal pressure and arranged to actuate valve means controlling flow of pressure air to the brake actuators, and pressure-sensitive reaction means responsive to the active braking pressure and acting in opposition to the input piston structure with a force which is variable in accordance with vehicle load. Such a valve, when used in a dual-line system, is commonly combined with or used in association with a relay or a relay-emergency valve which will effect automatic actuation of the trailer brakes upon a predetermined fall of pressure in the emergency line, and such combined apportioning valve and relay-emergency valve will be referred to hereinafter as of the kind mentioned.

In a system of this kind on a semitrailer combination it is necessary from the point of view of stability to ensure that a semitrailer fitted with an apportioning valve is not matched to a tractor not fitted with a modulated drive axle and the present invention provides means for cutting out the apportioning function of the valve if and when required whilst leaving the relay or the relay-emergency functions operable as before.

According to the invention a system as above mentioned comprises a cutout valve preferably remotely situated or controlled and operable at will to interrupt the application of braking pressure to the pressure-sensitive reaction means and to direct such pressure to the input piston structure in opposition to the signal pressure. Thus, the apportioning control is rendered inoperative and the input piston acts as a simple relay piston providing a constant 1:1 ratio of input to output.

A preferred embodiment of the invention will now be described with reference to the accompanying drawing which shows a combined apportioning and relay-emergency valve and the associated cutout valve in cross section and with their interconnections diagrammatically illustrated.

The relay-emergency/apportioning valve shown is our copending application, Ser. No. 793,763 filed Jan. 24, 1969 and comprises basically an input piston assembly 1 responsive to signal pressure that enters a port 30 into chamber 31 and actuating valve means 2 controlling flow of compressed air between a supply port 3 connected to the trailer reservoir and a delivery port 4 connected to the brake actuators, and a reaction piston 5 normally responsive to the active braking pressure and acting in opposition to the input piston assembly, the piston 5 exerting its force through a roller 6 movable along an inclined plane 7 the angle of which is variable in accordance with vehicle load by providing the inclined plane 7 on a pivoted yoke 8 which by a connection (not shown) between the vehicle frame and a wheel axle is displaced angularly in accordance with vehicle riding height.

Supply of the control pressure to port 30 is effected by a foot pedal (not shown) under operator control and, when pressure exists in chamber 31 sufficient to depress the piston assembly 1, stem 32 of the piston assembly moves down to first close the upper end of hollow valve means 2 and thereby disconnect the delivery port 4 from atmosphere and then displace valve means 2 away from seat 33 to connect supply port 3 to delivery port 4. In the above-identified application, the delivery port that is connected to the brake actuators is connected to a reaction piston chamber whenever the valve corresponding to valve means 2 herein is displaced from seat 33.

For the purpose of the present invention a two-way cutout valve 9 is provided for connecting the delivery port 4 of the apportioning valve alternatively to the reaction piston chamber 5a or to the space beneath the input piston assembly 1. The cutout valve is of the spool type and comprises a housing 10 formed with a central inlet port 11 and two outer discharge ports 12, 13 all opening into the housing bore, and a valve element 14 displaceable in said bore and having a peripheral groove 15 and also an axial passage 16 which extends completely to one end of the valve element and at its other end terminates in a series of transverse or radial passages 17. The open end of passage 16 is in permanent communication with an aligned passage 18 formed in a plug 19 closing the end of the housing, the passage 18 opening to atmosphere passed at check valve 20. The valve element 14 is attached at its other end to an operating rod 21 which is actuated either directly by a hand lever or equivalent means (not shown) or remotely through any known form of transmission.

In use, the inlet port 11 is connected by a conduit 22 to the valve chamber at the inner end of delivery port 4, discharge port 12 is connected by a conduit 23 to the space at the underside of piston assembly 1 whilst the other discharge port 13 is connected by a conduit 24 to the reaction chamber 5a and it will be seen that with the valve element 14 in the position shown the reaction piston is responsive to active braking pressure and functions in the normal manner to exert a reactive force on the valve-actuating piston assembly 1 in accordance with vehicle load. This action is essentially the same as disclosed in said application, Ser. No. 793,763. Should it be necessary to cut out the apportioning function of the valve without interfering with the relay and emergency functions, cutout valve 9 is actuated to move the valve element to the left as seen on the drawing to its other limit position whereby port 11 is disconnected from port 13 and is connected to port 12. Thus, active braking pressure derived from supply port 4 now acts directly on the underside of piston assembly 1 instead of through the apportioning control and the unit functions as a simple relay valve. It will be noted that in either position of the valve element that port of the pair 12, 13 disconnected from the braking pressure is automatically connected to exhaust.

Conveniently, the cutout valve is mounted on the trailer at a point where it is readily accessible to an operator effecting a coupling operation between tractor and trailer.

We claim:

1. In a fluid pressure braking system for a motor vehicle, valve means controlling flow of fluid under pressure from a supply port to a delivery port connected brake actuator means in said system, displaceable fluid pressure responsive means mounted in operative association with said valve means, means for applying an actuating signal pressure to one side of said pressure responsive means to cause it to actuate said valve means to admit active braking pressure from said supply port to said delivery port, pressure-sensitive reaction means having a motion transmitting connection to said displaceable fluid pressure responsive means, and cutout valve means operable to selectively connected said delivery port to said pressure-sensitive reaction means or to oppose displacement of said displaceable fluid pressure responsive means by said signal pressure.

2. In the system defined in claim 1, said displaceable fluid pressure responsive means being a piston assembly having a first chamber at one side for introduction of signal pressure, and a second chamber at the other side for selective introduction of the active braking pressure by the cutout valve means.

3. In the system defined in claim 2, said cutout valve means comprising a housing having an inlet connected to said delivery port and two outlets connected respectively to said pressure-sensitive reaction means and said second chamber, and a movable valve element in said housing displaceable between a first position where it connects the inlet to only one outlet and a second position where it connects the inlet only to the other outlet.

4. In the system defined in claim 6, said cutout valve means being a spool valve slidable in the housing and having an external operator.

5. In the system defined in claim 1, said pressure-sensitive reaction means comprising a piston assembly having one side coupled by said motion transmitting connection to said displaceable fluid pressure responsive means and at its other side a chamber in fluid communication with said cutout valve means.

6. In the system defined in claim 5, said pressure-sensitive reaction means comprising a piston assembly, and said motion transmitting connection comprising two thrust transmitting rods connected at opposite ends to said displaceable fluid pressure responsive means and said piston assembly respectively and supported at their point of intersection by a roller riding on an inclined surface the angle of which is adapted to be varied in accord with vehicle load.

7. In the system defined in claim 5, said cutoff valve means being disposed in a housing separate and spaced from a housing mounting said valve means, displaceable fluid pressure responsive means and pressure-sensitive reaction means, and there being conduits connecting said housing.